United States Patent [19]
Picardat

[11] 3,777,991
[45] Dec. 11, 1973

[54] LAWN TREATING MACHINE
[76] Inventor: Robert Picardat, 7712 Ridgecrest Dr., Alexandria, Va. 22380
[22] Filed: Feb. 11, 1972
[21] Appl. No.: 225,556

[52] U.S. Cl.............. 239/656, 239/661, 239/670, 239/683
[51] Int. Cl............................................ A01c 19/00
[58] Field of Search.................. 239/683, 685, 661, 239/670, 656, 687; 298/7, 8 H

[56] References Cited
UNITED STATES PATENTS
2,638,350   5/1953   Lyerly.......................... 239/687 X
2,463,855   3/1949   Crawford......................... 239/661
2,600,167   6/1952   Jones............................. 239/661

Primary Examiner—M. Henson Wood, Jr.
Assistant Examiner—A. Kashnikow
Attorney—Hyman Berman et al.

[57] ABSTRACT

A lawn treating machine mounted on and driven by a garden tractor and including a scattering mechanism for scattering lawn treating materials carried in hoppers supported on the tractor. The scattering mechanism includes a generally horizontal rotatable disc and rotating feed elements which feed material from the hoppers to the disc.

9 Claims, 7 Drawing Figures

PATENTED DEC 11 1973

LAWN TREATING MACHINE

BACKGROUND OF THE INVENTION

FIELD OF THE INVENTION

The present invention relates to lawn treating machines of the type adapted to scatter treating materials on the lawn.

SUMMARY OF THE INVENTION

A garden tractor supports and drives a hopper fed scattering mechanism for scattering lawn treating materials including grass seed and fertilizers on the lawn as the tractor moves thereacross.

The primary object of the invention is to provide a self-contained lawn treating machine for scattering lawn treating materials on the lawn as the machine moves thereover.

Other objects and advantages will become apparent in the following specification when considered in the light of the attached drawings.

DESCRIPTION OF THE PREFERRED EMBODIMENT

Figure 1:
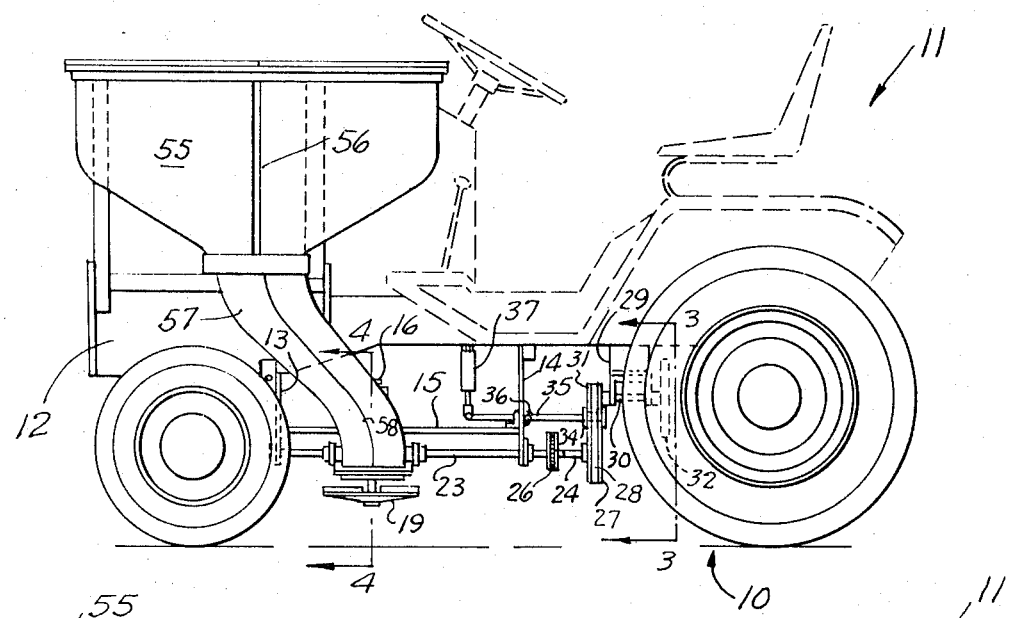
FIG. 1 is a side elevation of the invention.
Figure 2:
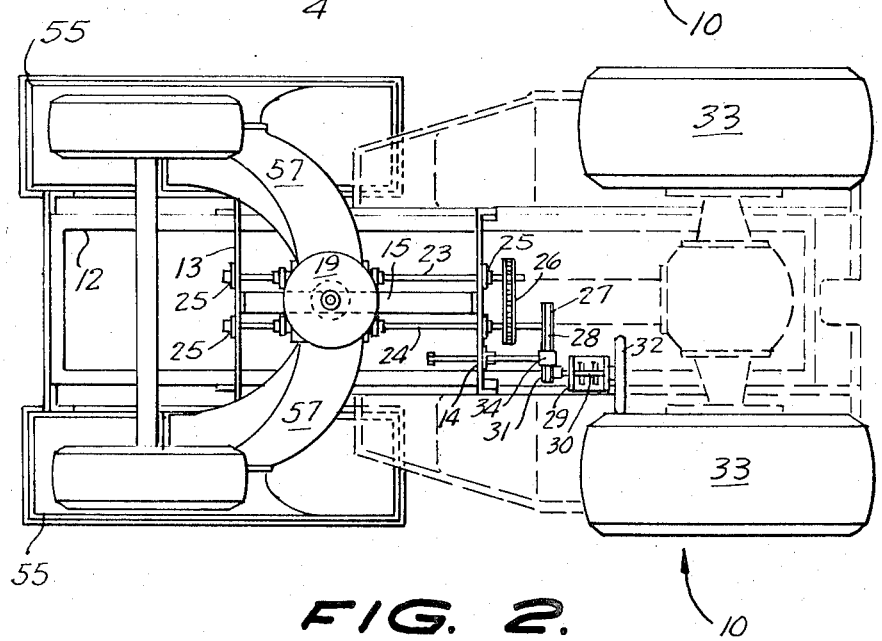
FIG. 2 is a bottom plan view of the invention.
Figure 3:
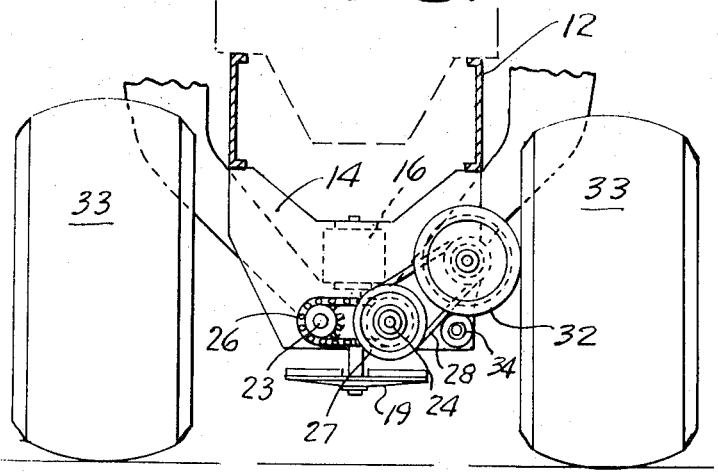
FIG. 3 is an enlarged fragmentary transverse sectional view taken along the line 3—3 of FIG. 1, looking in the direction of the arrows.

Referring now to the drawings in detail, wherein like reference characters indicate like parts throughout the several figures, the reference numeral 10 indicates generally a lawn treating machine constructed in accordance with the invention.

The lawn treating machine 10 includes a four-wheel garden tractor indicated generally at 11, including a generally horizontal frame 12.

A transverse forward plate 13 is secured to and depends from the frame 12 and a rear transverse frame plate 14 is secured to and depends from the frame 12 in parallel relation to the frame plate 13. A central longitudinal frame member 15 extends between and has its opposite ends secured to the frame plates 13, 14. The frame member 15 is substantially parallel to the ground supporting the tractor 11.

Figure 4:
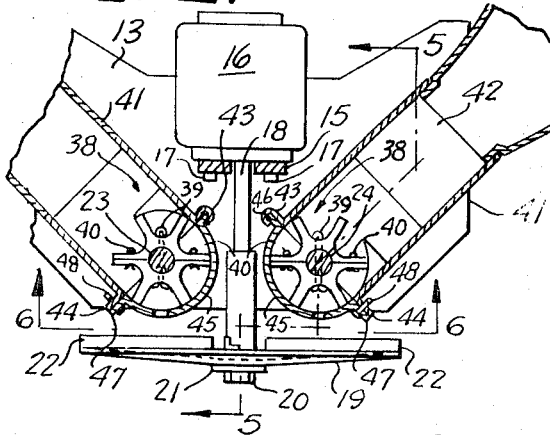
FIG. 4 is an enlarged fragmentary transverse sectional view taken along the line 4—4 of FIG. 1, looking in the direction of the arrows.
Figure 5:
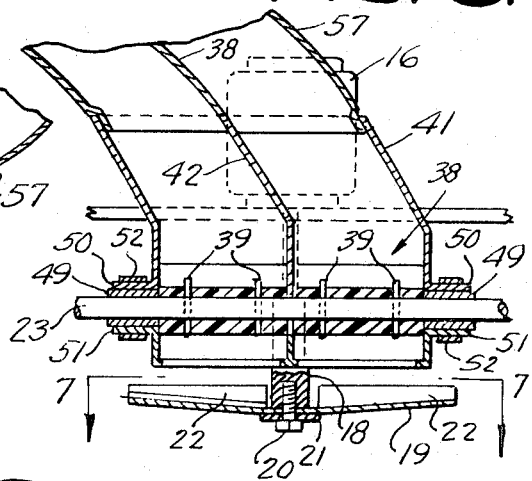
FIG. 5 is a fragmentary longitudinal sectional view taken along the line 5—5 of FIG. 4, looking in the direction of the arrows.
Figure 7:
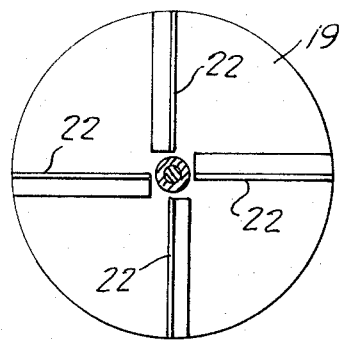
FIG. 7 is a horizontal sectional view taken along the line 7—7 of FIG. 5, looking in the direction of the arrows.

An electric motor 16 is secured to the frame member 15 by bolts 17 and has a depending shaft 18 secured thereto. A slightly concave spreader disc 19 is secured to the lower end of the shaft 18 by means of a bolt 20 and washer 21. A plurality of upright radially extending vanes 22 are rigidly secured to the upper face of the concave disc 19, as can be seen in FIGS. 4, 5 and 7.

A pair of longitudinally extending spaced parallel shafts 23, 24 have their opposite ends extending through the frame members 13, 14 and are journaled in bearings 25 secured thereto. The shafts 23, 24 are connected together by a chain and sprocket drive 26 so that the shafts 23, 24 rotate in the same direction and at the same speed.

A V-belt pulley 27 is secured to the rear end of the shaft 24 and a V-belt 28 is trained thereover. A bracket 29 is secured in depending relation to the frame 12 and has a longitudinally extending shaft 30 journaled therein. A v-belt pulley 31 is carried by the forward end of the shaft 30 with the belt 28 trained thereover. A traction wheel 32 is secured to the rear end of the shaft 30 and engages the side of one of the rear wheels 33 of the tractor 11. A belt tightener pulley 34 engages the belt 28 and is journaled on a shaft 35 mounted in a bracket 36 carried by the frame member 15 for swinging movement about a horizontal transverse pivot. A hand-actuated control 37 is provided for swinging the shaft 35 to loosen and tighten the belt 28 so as to drive the shaft 23, 24 as desired.

A plastic multi-bladed agitator, indicated generally at 38, is secured to each of the shafts 23, 24 by means of cotter keys 39 extending therethrough. The agitators 38 are formed of identical halves secured together by cotter keys 40, as can be seen in FIG. 4.

An agitator housing 41 generally rectangular in form encompasses one-half of each of the agitators 38 and has a central partition 42 dividing the agitator housing 41 in half. A U-shaped flange 43 is formed along the upper edge of the agitator housing 41 and an angular flange 44 is formed along the edge parallel thereto. A semi-cylindrical cover 45 has a flange 46 along one side edge thereof which is adapted to engage in the U-shaped flange 43 with a second angular flange 47 formed along the opposite side thereof for contact with the annular flange 44. Cotter keyed retainer pins 48 lock the flanges 47, 44 together to secure the cover 45 to the housing 41.

Figure 6:
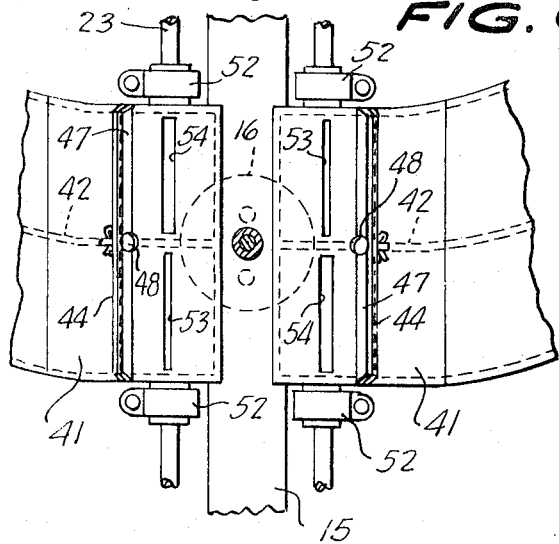
FIG. 6 is a fragmentary horizontal sectional view taken along the line 6—6 of FIG. 4, looking in the direction of the arrows.

Bushings 49 are journaled on the shafts 23, 24 at each end of the housings 41. Semi-cylindrical flanges 50 integrally formed on opposite ends of the housings 41 are supported on the bushings 49. Semi-cylindrical flanges 51 integrally formed on opposite ends of the covers 45 also engage the bushings 49 oppositely of the flanges 50. A clamp 52 encircles the flanges 50, 51 to clamp them to the bushing 49 and support the housing 41 on the shafts 23, 24. The covers 45 each have a small longitudinal slot 53 and a large longitudinal slot 54 formed therein as can be seen in FIG. 6.

A pair of hoppers 55 are supported from the frame 12 on opposite sides of the tractor 11 and each is provided with a transversely extending partition 56 dividing them into longitudinally extending halves.

A pair of agitator chutes 57 of a generally arcuate form extend downwardly and inwardly as well as rearwardly from the hoppers 55 to the agitator housings 41. The chutes 57 have a central partition 58 extending therethrough aligning with the partition 56 and the hopper 55 and the partition 42 in the housing 41.

The housings 41, which are supported solely on the shafts 23, 24 respectively, are prevented from rotating about the shafts 23, 24 by the lower ends of the chutes 57.

In the use and operation of the invention, the hoppers 55 are filled with lawn treating materials such as fertilizer, grass seed, weed eradicating chemicals, pre emergence crab grass control chemicals, insecticides and the like. The tractor is driven over the ground with the V-belt 28 tightened by the pulley 34 so as to drive the agitators 38 from the rear wheels 33. The agitators 38 in rotating in the housings 41 dispense materials through the slots 53, 54 with the material falling on the scattering disc 19 rotated by the motor 16. When necessary to move the tractor from place to place without scattering the lawn treating materials, the hand control 37 is actuated to reduce the pressure of the pulley 34 on the V-belt 28 so that the V-belt may slip to thus act as a declutching operation. In this instance, the fit of the agitators 38 in their housings 41 is such that when not rotating they form a valve to prevent the flow of lawn treating materials to the slots 53, 54.

As the agitators 38 become worn, replacement thereof can be simply done by removing the covers 45, cotter keys 39 and cotter keys 40 to thus permit the two halves of the agitators 38 to be separately removed from the shafts 23, 24. New agitators 38 can then be installed by reversing the procedure and replacing the covers 45.

Having thus described the preferred embodiments of the invention, it should be understood that numerous structural modifications and adaptations may be resorted to without departing from the spirit of the invention.

What is claimed is:

1. A lawn treating machine mounted on a garden tractor of the type including a frame supported on ground-engaging wheels comprising hopper means supported on the frame of said tractor, a rotary dispensing agitator on said tractor, means for feeding material from said hopper means to said agitator, a motor driven generally horizontal scattering disc mounted on said tractor and positioned below said agitator to receive material dispensed thereby and scatter it outwardly therefrom, means driven by one of said ground-engaging wheels for rotating said agitator, said means for driving said agitator including a shaft extending through said agitator with said agitator including a pair of identical halves divided longitudinally and means for detachably securing said halves to said shaft.

2. A device as claimed in claim 1, wherein the means for detachably securing said halves to said shaft include cotter keys extending through said halves and said shaft and cotter keys securing said halves together.

3. A device as claimed in claim 1, wherein a pair of parallel transverse frame plates are secured to said tractor frame and depend therefrom and said shaft is journaled in said plates at opposite ends of said shaft.

4. A device as claimed in claim 3, including a longitudinal frame member extending between and secured to said frame plates in generally horizontal relation with said motor driven scattering disc supported on said longitudinal frame member.

5. A device as claimed in claim 4, wherein said hopper means, said agitator housing, and the means for feeding material from said hopper to said agitator are each divided intermediate the front and rear ends thereof by a transversely extending partition.

6. A lawn treating machine mounted on a garden tractor of the type including a frame supported on ground-engaging wheels comprising hopper means supported on the frame of said tractor, a rotary dispensing agitator on said tractor, means for feeding material from said hopper means to said agitator, a motor driven generally horizontal scattering disc mounted on said tractor and positioned below said agitator to receive material dispensed thereby and scatter it outwardly therefrom, means driven by one of said ground-engaging wheels for rotating said agitator, said means driven by said ground-engaging means including a belt tightening clutch for engaging and disengaging said drive from said agitator.

7. A lawn treating machine mounted on a garden tractor of the type including a frame supported on ground-engaging wheels comprising hopper means supported on the frame of said tractor, a rotary dispensing agitator on said tractor, means for feeding material from said hopper means to said agitator, a motor driven generally horizontal scattering disc mounted on said tractor and positioned below said agitator to receive material dispensed thereby and scatter it outwardly therefrom, means driven by one of said ground-engaging wheels for rotating said agitator, said means for feeding material from said hopper means to said agitator including an agitator housing at the lower end thereof with said agitator housing comprising a generally rectangular tube having a semi-cylindrical cover detachably secured to the lower end thereof.

8. A device as claimed in claim 7, wherein said agitator housing is supported on said agitator shaft.

9. A device as claimed in claim 8, wherein said agitator housing cover underlies said agitator and is provided with a dispensing slot overlying said scattering disc.

* * * * *